US010320922B1

(12) United States Patent
Hussain et al.

(10) Patent No.: US 10,320,922 B1
(45) Date of Patent: Jun. 11, 2019

(54) INVENTORY MANAGER FOR DISTRIBUTED SYSTEMS

(71) Applicant: Amazon Technologies, Inc., Reno, NV (US)

(72) Inventors: Amjad Hussain, Bellevue, WA (US); Sivaprasad Venkata Padisetty, Bellevue, WA (US); Emily Grace Aimette Freebairn, Seattle, WA (US); Steven Merlin Twitchell, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 15/192,855

(22) Filed: Jun. 24, 2016

Related U.S. Application Data

(60) Provisional application No. 62/314,067, filed on Mar. 28, 2016.

(51) Int. Cl.
*H04L 29/08* (2006.01)
*H04L 12/24* (2006.01)

(52) U.S. Cl.
CPC .......... *H04L 67/16* (2013.01); *H04L 41/5051* (2013.01); *H04L 67/34* (2013.01); *H04L 67/36* (2013.01)

(58) Field of Classification Search
CPC ..................................................... H04L 67/16
See application file for complete search history.

(56) References Cited

U.S. PATENT DOCUMENTS

| | | | |
|---|---|---|---|
| 4,617,663 | A | 10/1986 | Lake |
| 6,076,030 | A | 6/2000 | Rowe |
| 6,785,882 | B1 | 8/2004 | Goiffon |
| 8,019,780 | B1 | 9/2011 | Pinkerton et al. |
| 9,083,749 | B1 | 7/2015 | Roth et al. |
| 2003/0028809 | A1 | 2/2003 | Goodman |

(Continued)

FOREIGN PATENT DOCUMENTS

WO     2017/193074     11/2017

OTHER PUBLICATIONS

Non-Final Office Action issued in corresponding U.S. Appl. No. 15/148,869 dated Feb. 27, 2018.
(Continued)

*Primary Examiner* — Vivek Srivastava
*Assistant Examiner* — Nicholas P Celani
(74) *Attorney, Agent, or Firm* — Hogan Lovells US LLP

(57) ABSTRACT

Mechanisms are presented by which a customer of a resource provider can determine information about the portions of shared resources that are allocated to the customer. The information can include, for example, the software, operating systems software versions, software updates, software patches, and other such packages installed and/or executing on the various resources. In at least some embodiments, a customer can select one of a set of predefined actions that enables the customer to query the allocations, or resource instances, to obtain the information, such as through a series of inventory reports stored to a central location. In at least some embodiments the information can be obtained using a set of gatherers each configured to obtain a specific type of information.

20 Claims, 6 Drawing Sheets

(56) References Cited

U.S. PATENT DOCUMENTS

| | | | |
|---|---|---|---|
| 2004/0205136 A1* | 10/2004 | Whittenberger | G06Q 10/10 709/206 |
| 2008/0005024 A1 | 1/2008 | Kirkwood | |
| 2008/0049644 A1* | 2/2008 | Halbert | H04L 41/12 370/254 |
| 2010/0293269 A1* | 11/2010 | Wilson | G06F 9/5061 709/224 |
| 2012/0131645 A1 | 5/2012 | Harm | |
| 2013/0227137 A1 | 8/2013 | Damola | |
| 2013/0238780 A1* | 9/2013 | Devarakonda | G06F 9/5072 709/224 |
| 2015/0281180 A1 | 10/2015 | Raman | |
| 2016/0381032 A1 | 12/2016 | Hashmi | |
| 2017/0116013 A1 | 4/2017 | Chen | |

OTHER PUBLICATIONS

International Search Report and Written Opinion issued in connection with International Application No. PCT/US2017/031405 dated Oct. 13, 2017.

Final Office Action issued in corresponding U.S. Appl. No. 15/148,869 dated Aug. 16, 2018.

Advisory Action issued in corresponding U.S. Appl. No. 15/148,869 dated Nov. 23, 2018.

* cited by examiner

INVENTORY MANAGER FOR DISTRIBUTED SYSTEMS

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. It can be difficult, however, for customers to be able to determine the software packages that are installed across the various resources allocated to those customers. It can be even more difficult to determine and manage the various versions of the installed software packages, as well as any patches applied to each.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources in an electronic environment. In particular, various approaches provide mechanisms by which a customer of a resource provider can determine information about the portions or subsets of those resources that are allocated to the customer. The information can relate to physical resources, such as computing devices and servers, as well as virtual resources, such as virtual machines and machine instances. The information can include, for example, the software, operating systems, software versions, software updates, software patches, and other such packages installed and/or executing on the various resources. In at least some embodiments, a customer can select one of a set of predefined actions that enables the customer to query his or her allocations, or resource instances, to obtain the information, such as through a series of inventory reports stored to a central location. In at least some embodiments the information can be obtained using a set of gatherers each configured to obtain a specific type of information from at least one specified location or type of location. A general framework can be used to remotely define, execute, collect, and analyze data from, for example, within a guest Operating System (OS). Such a framework can allow for collection of inventory data within a virtual machine. The framework can be extendable in order to provide for the collection of different types of data, and can provide an extensible way to output the data for post-processing and data analysis.

Various other such functions can be used as well within the scope of the various embodiments as would be apparent to one of ordinary skill in the art in light of the teachings and suggestions contained herein.

Figure 1:
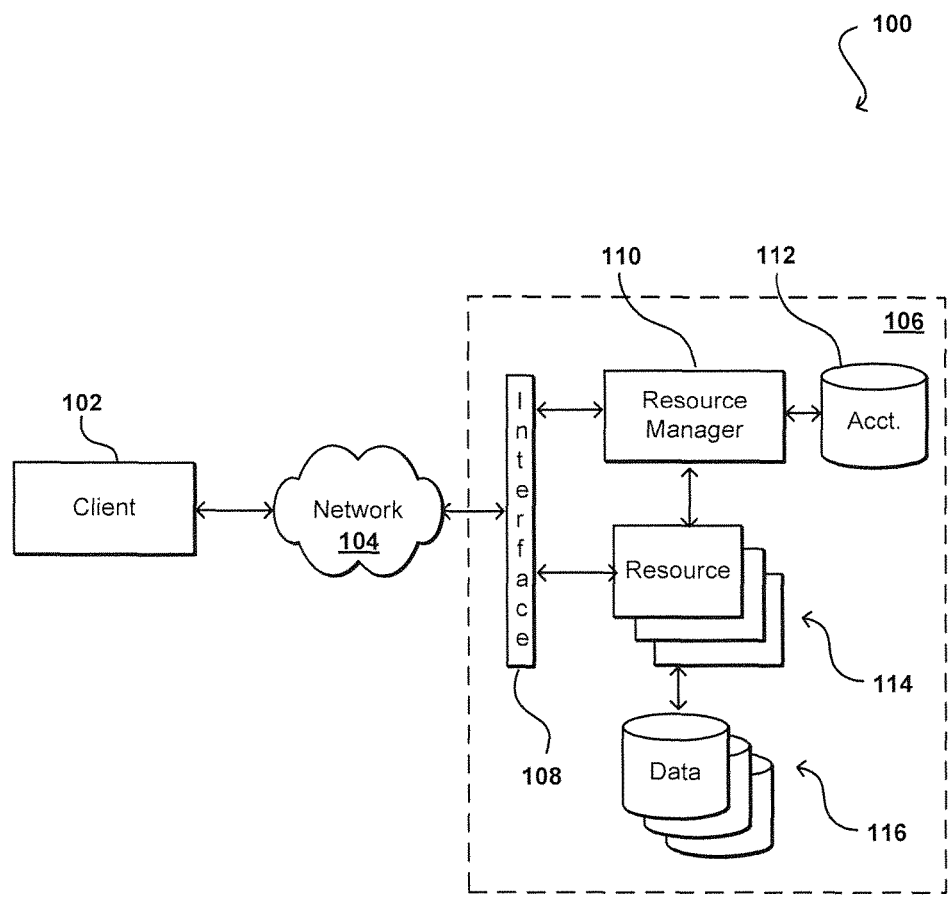
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an certificate authority, a key management service, a corporate entity, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. In some embodiments the resources or operators within the environment can obtain credentials useful in signing commands or requests for various purposes as discussed and suggested herein. Although illustrated outside the resource provider environment, it should be understood that the certificate authority could be a service offered from within the resource provider environment, among other such options.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, a customer of such a multi-tenant environment might have a variety of virtual machines or other such instances of different types and configurations allocated across the environment. Using conventional approaches, it can be difficult (or at least impractical) to attempt to determine information about the configuration of those various instances. Accordingly, approaches presented herein provide a flexible framework that enables a customer to remotely define, execute, collect, and analyze data from within, for example, a guest Operating System. In at least some embodiments, such a framework can allow for the collection of inventory data within a virtual machine. Such a framework can be extendable in order to allow for the collection of various types of data, and can provide an extensible way to output the data for post-processing or other such analysis.

Approaches in accordance with various embodiments can collect and process data that is related to an operating system (OS) for a resource instance or virtual machine, as well as software installed on the OS, which runs in a remote environment. A customer might be running Windows, Linux, and/or another OS on a fleet of virtual machines. It would be desirable for the customer to be able to, in a way that is not very complicated or burdensome, specify the information of interest to the customer and send a command or signal to the appropriate instances to collect the specified information. This can include specifying a time for collecting and sending the data, among other such aspects. The instances can then asynchronously collect the relevant information, format the information according to a general and flexible schema, and output the data back into a specified location so the data can be obtained and analyzed as appropriate.

The customer in such a situation might want to determine the software running on the various virtual machines, as well as the version of the OS that is installed, the patches or updates that are applied to that OS, and other such information. Gathering this information will enable a customer to determine, for example, the number of virtual machines running a specific OS version or having a critical update or patch applied, etc. The customer can then make or request changes as appropriate.

Approaches in accordance with various embodiments provide a flexible gathering mechanism and approaches for utilizing that mechanism. There can be a set of predefined types that can be collected, and this set can be extended to cover additional types of data. If there is a specific application that might be relevant to the customer, the customer or provider of that application can use this framework to provide a gatherer to obtain the relevant information. The output can be structured or semi-structured so that it can be incorporated into various workflows. The ability to output in a general and flexible way prevents the need for the system to support all legacy and existing workflows, etc. The output can be provided in a set of workflow reports, for example, that are structured in a determined way and accessible from a specified location. These approaches also allow for the collection of similar data sets across a fleet or large set of VMs so that a customer will not have to go one by one, or have other ways of collecting that information across a large set of instances. Various embodiments provide a set of selectable output formats, such as comma separated variable or human readable forma, and the customer can select the appropriate format and incorporate it into the existing workflow.

Figure 2:
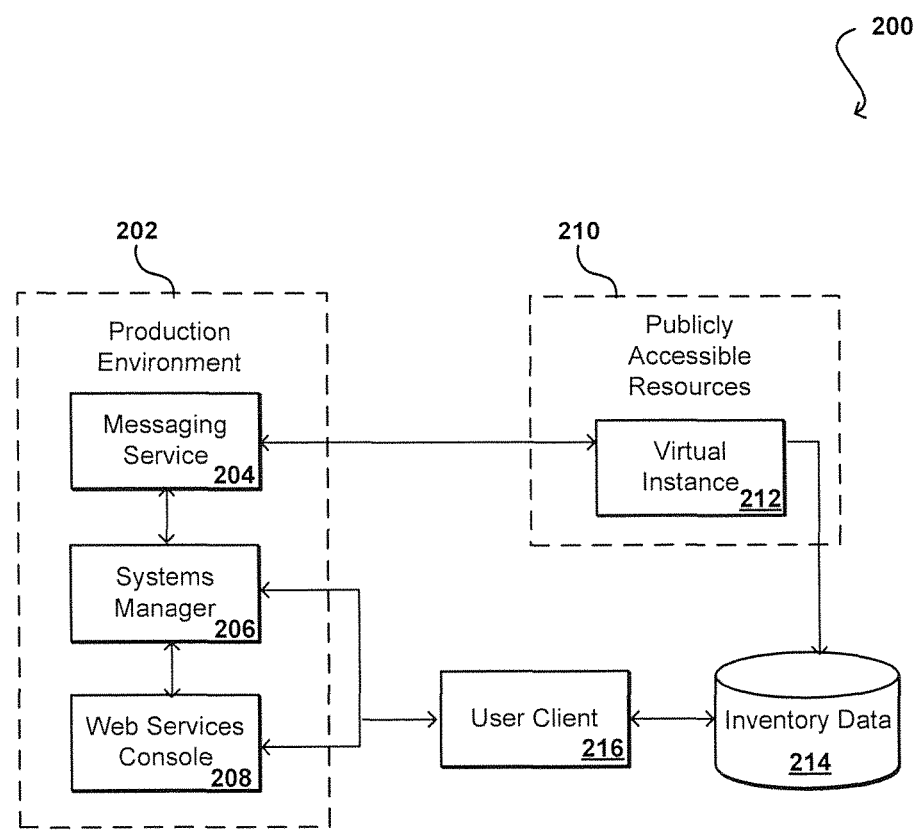
FIG. 2 illustrates an example subsystem for obtaining inventory data that can be utilized in accordance with various embodiments.

FIG. 2 illustrates an example framework implementation 200 that can be utilized in accordance with various embodiments. In this example, the framework (here shown as part of a production environment 202) includes a messaging service 204, a systems manager 206 for commands, and a web services console 208, although additional or alternative components and elements can be used with such frameworks in accordance with the various embodiments. In this example, the framework can communicate with a set of customer virtual instances 212 located in a publicly-accessible (or at least customer-accessible) resource environment 210. The systems manager 206 communicates with the internal messaging service 204, which can route messages between an instance 212 and the back end infrastructure in order to send the payload to the appropriate instance. Various virtual instances 212 can obtain the appropriate information, which can be output to an inventory data store 214 or other such repository. The repository can be located in the same or a different type of system or service than is used for the resource instances. A user client 216 can query the inventory data store 214 to obtain the requested data in the appropriate format. The systems manager 206 can be responsible for inventory management, and in some embodiments can receive the information from the various instances. The systems manager can be responsible for managing the gatherers of the various types of information, and making those available to the user client 216 through the appropriate console 208.

Figure 3:
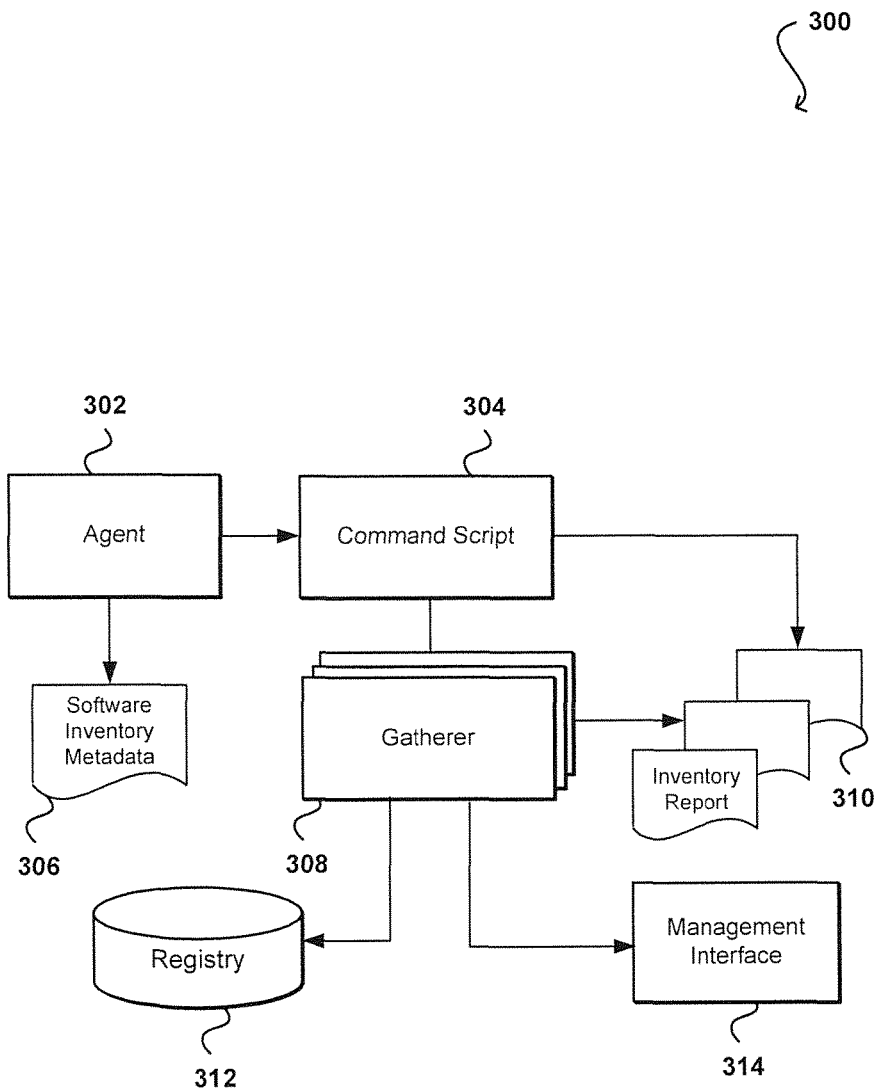
FIG. 3 illustrates an example flow for obtaining inventory data that can be utilized in accordance with various embodiments.

FIG. 3 illustrates an example flow 300 for collecting the requested data that can be utilized in accordance with various embodiments. In at least some embodiments, this flow would occur independently within (or for) each of the relevant customer virtual instances 212 of FIG. 2, such as those identified in the set for data collection. Here, a systems manager agent 302 has provided a set of gatherers 308 that can be executed using a command script 304 provided via the agent 302. As will be discussed in more detail, the command script 304 can be specified by the user through an appropriate console or command line, among other such options. As mentioned, there can be at least one gatherer 308 for each type of information to be obtained. As an example, there can be one gatherer for the OS information, one gatherer to obtain information about the applications installed on the instance, one for patches or updates installed, etc. For a given type of information, such as the OS information, there can also be multiple gatherers that each obtain the information from a different type of location, such as one gatherer that obtains information from the registry while another obtains information from a management interface, etc. In at least some embodiments, a customer or other such entity can provide additional gatherers as well, as may collect specific types of information not otherwise obtained by an existing gatherer, etc. When a message is received to the agent 302 from the framework, the agent executes the appropriate script 304 which causes the relevant gatherers 308 to obtain the data and use that data to generate a set of inventory reports 310. This can include, for example, calling into the OS registry 312 (Window, Linux, or otherwise), a management interface 314, a file system, relevant APIs, etc. In at least some embodiments, each gatherer 308 for a given instance can generate a respective inventory report 310. The inventory reports for an instance can be stored in a folder for that instance, where each instance folder will include an inventory report for each gatherer that was executed for that instance. The folder of reports for the instance can be stored to a specified location that can be consumed in other environments and for other workflows as well.

A gatherer as used herein refers to a "generic" script or unit of execution that gathers a particular type of data. The framework might provide a basic set of gatherers that obtain information about the OS, programs installed, patches installed, etc. As mentioned, customers or other entities can also provide custom gatherers to gather a different type of data. These gatherers could gather information about, for example, firewall ports configured on a VM, specific information about the available disks, etc. A gatherer thus can take the form of a predefined unit or bundle of execution that obtains a specified set of data and outputs that set of data in a specified format. If the output does not conform to that standard then the output can be rejected. As mentioned, the gatherers for a specific VM would run on the VM itself in at least some embodiments. The gatherers can be downloaded from a remote location and installed on the instance, and can function as a plugin to the runtime agent or command agent.

Permissions and access control can be managed from the service side in at least some embodiments. Once a gatherer is installed on an instance as a high privilege operation, for example, the gatherer can collect any relevant information from the instance. Access then can be restricted by indicating which entities can communicate with the instance and what types of information can be communicated. Access control in at least some embodiments can be performed by the systems manager 206 of FIG. 2. An unauthenticated and/or unauthorized person may not be permitted to communicate with the framework in order to instruct the framework to collect inventory information. Various authentication and authorization services can be utilized for such determinations. The messaging service in at least some embodiments can utilize a secure channel, and though the framework may be able to run various tasks, the access control can be enforced by the systems manager and messaging service, at least with respect to what can be run on behalf of the customers.

In at least some embodiments, the gatherers are scripts or applications that can be stored to a particular directory that can have an applied access control list, for example, enabling only the systems manager agent and its owner (the security principal) to access the directory. The gatherers can be registered on the system for use. So when a command comes into the systems agent asking to collect specified types of information, the agent can determine whether it has the appropriate gatherers and if so the agent can invoke those gatherers. If the agent does not have one or more of the required gatherers, the agent can attempt to download the gatherer or return an error that that the type of information cannot be accessed at the present time.

In a first pass the inventory reports are generated on the VM or storage instance itself, in the local file system. The systems manager agent can then upload those local files to a logically centralized location from which those files can be discovered and/or access, where the location in at least some embodiments may be customer-specified. When the customer issues a command to collect specific types of information, the customer in some embodiments can specify a bucket or container to receive the reports, to which the customer has applicable permissions. The reports thus can be uploaded to a customer's bucket, and the customer's specified permissions control which entities have access to that bucket. As mentioned, the gatherers can query or call into the OS registry and management interface for data, among other such options. A set of default gatherers can be provided in some embodiments such as to get information about the OS, the installed applications, patches to the OS, and patches to the installed applications. The framework can be utilized in any appropriate remote execution environment, including customer environments, although additional authentication and authorization processes might be used for instances in a customer environment.

In at least some embodiments, entities inside or outside the customer-provider relationship can utilize at least some of the various gatherers. An authorized entity can run the script file locally on the machine to collect the relevant information. For a solution that patches operating systems, for example, a first step could be to determine the OS running on the box, as well as any patches or updates that have already been applied.

Figure 4:
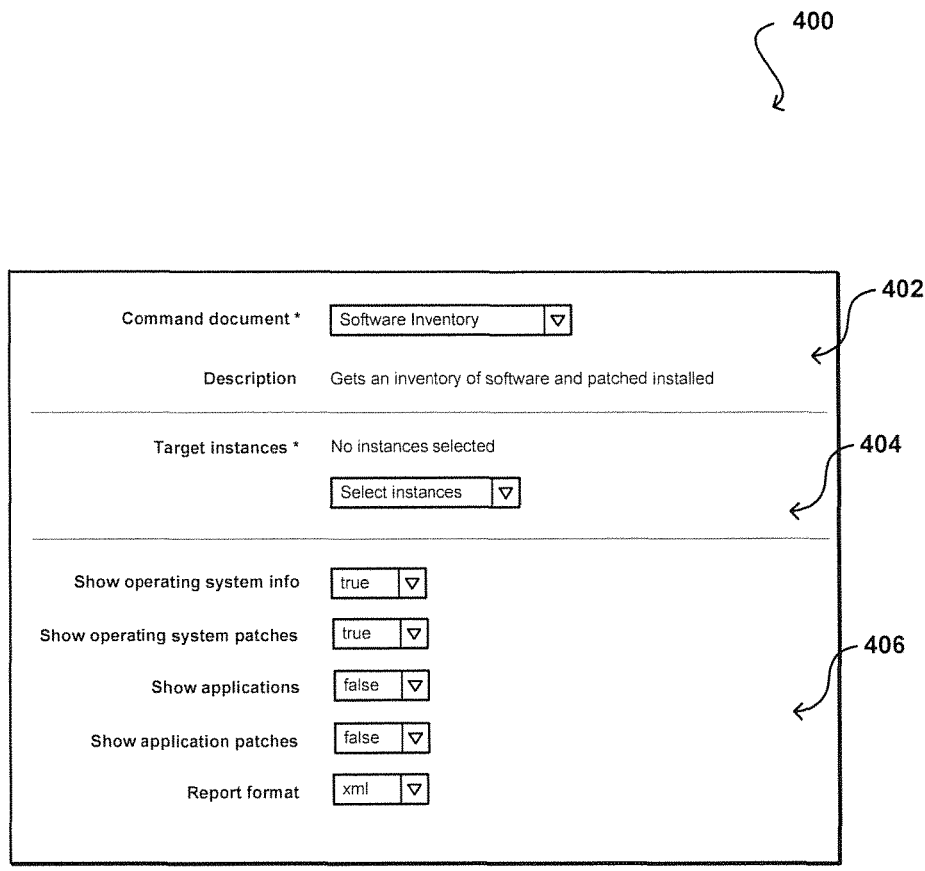
FIG. 4 illustrates an example user interface that can be utilized in accordance with various embodiments.

FIG. 4 illustrates an example interface 400 that can be utilized in accordance with various embodiments. In this example the interface is part of a console that provides options 406 that enable a customer or other entity to select the appropriate types of data to be obtained, options 404 to specify the instances from which the data is to be obtained, and other such tasks. A customer wanting to run a command can select an option 402 specifying the command document for the data to be gathered. The customer can then specify any appropriate VMs or instances, although some embodiments allow for the selection of groups of instances, all customer instances, etc. The customer can then specify the appropriate parameters and cause the command to be executed.

The following is an example of a JSON schema that can be utilized in accordance with various embodiments:

```
"OperatingSystem": {
"Schema": "1.0",
"Date": "2015-11-23T18:27:00Z",
"HostName": "12345",
"VMId": "i-12345",
"Publisher": "Microsoft Corporation",
"OSName": "Microsoft Windows 7 Enterprise",
"OSVersion": "6.1.7601",
"ExtendedProperties"=[
    {"Key": "ServicePackLevel", "Value": "Service Pack 1"},
    {"Key": "OSArchitecture", "Value": "64-bit"},
    {"Key": "OSLanguage", "Value": "1033"},
    {"Key": "ProductType", "Value": "1"},
    {"Key": "OperatingSystemSKU", "Value": "4"},
    {"Key": "Status", "Value": "OK"}
]
},
"OperatingSystemPatches": {
"Schema": "1.0",
"Date": "2015-11-23T18:27:00Z",
"HostName": "12345",
"InstanceId": "i-12345",
"Patches": [
    {
      "PatchId": "KB2849697",
      "Description": "Update",
      "InstallationDate": "2014-06-11T00:00:00Z",
      "ExtendedProperties"=[ ]
    },
    . . .
],
"ExtendedProperties"=[ ]
}
```

In this example the requested information includes information about the operating system and patches to the operating system. The schema version is indicated, which provides the ability to update schemas as appropriate. The schema also includes a series of key-value pairs that are common across all platforms. An extended properties section provides flexibility in case support is added for different OS types, as well as additional things that might be OS-specific. The output can be combined into a structured output format so the relevant information can be discovered and extracted programmatically. A customer can also have the ability in some embodiments to replace one of the default gatherers with their own custom gatherer. The customer can use the same schema but collect very different information.

Figure 5:
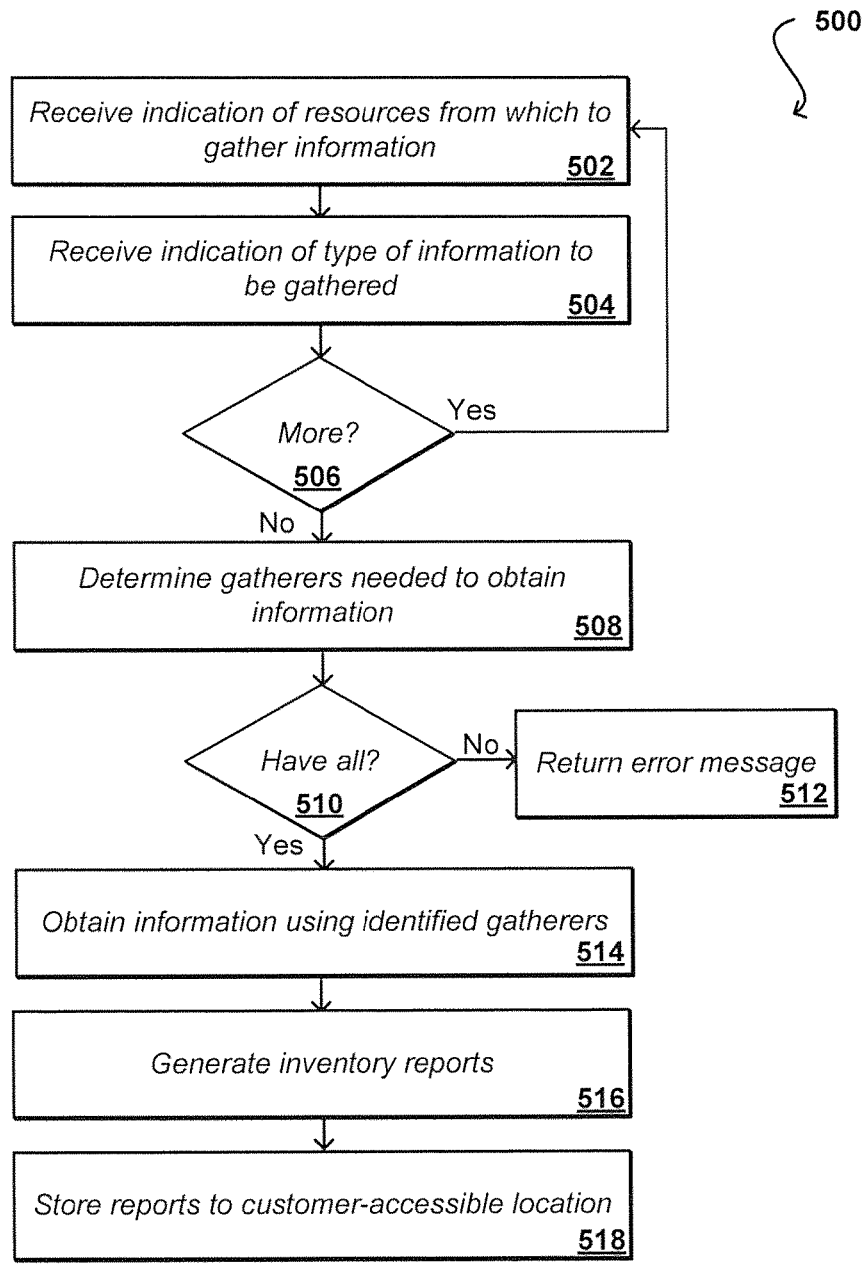
FIG. 5 illustrates an example process for obtaining software deployment information from a group of resources that can be utilized in accordance with various embodiments.

FIG. 5 illustrates an example process 500 for gathering information from a set of resources that can be utilized in accordance with various embodiments. It should be understood that for this and other processes discussed herein that there can be additional, alternative, or fewer steps performed in similar or alternate orders, or at least partially in parallel, within the scope of the various embodiments unless otherwise specifically stated. In this example, an indication of the resources from which information is to be gathered can be received 502. This can take the form of a selection of a set or subset of resources identified by a customer (or other type of user), such as through a console or command line interface. As mentioned, the resources can be virtual resources such as virtual machines or machine instances running on one or more physical resources, among other such options. An indication of a type of information to be gathered for each resource can also be received 504, such as may be in response to a customer specifying a group or set of resources, a type of resources, specific resources, or other such selections through the interface or another such mechanism. If it is determined 506 that there are more resources for which to gather information, or additional types of information to gather, then the process can continue.

Once the resources have been identified, and the types of information indicated, the gatherers needed to obtain the information can be determined 508. In some embodiments a customer may have specified specific, pre-defined commands that have specific gatherers associated. In other embodiments the gatherers may be associated with specific resources and/or types of data, and are determined dynamically in response to the selections, among other such actions. A determination can be made 510 as to whether all necessary gatherers are available for use in gathering the information. If not, an error message can be returned 512 or another such action taken, such as to attempt to locate or request the missing gatherer(s). If the gatherers are available, the information can be obtained 514 for the identified resources using the respective gatherers. In some embodiments, an inventory report can be generated 516 for each gatherer, although other inventory reports can be generated in other embodiments, such as one per resource or type of resource, one per type of data, etc. As the reports are generated, or once some or all reports are generated, the reports can be stored 518 to a customer-accessible location, such as a folder or bucket specified by the customer or another such entity. These reports can then be made available to the customer and/or other such entities with the appropriate access permissions or other such authorization.

Figure 6:
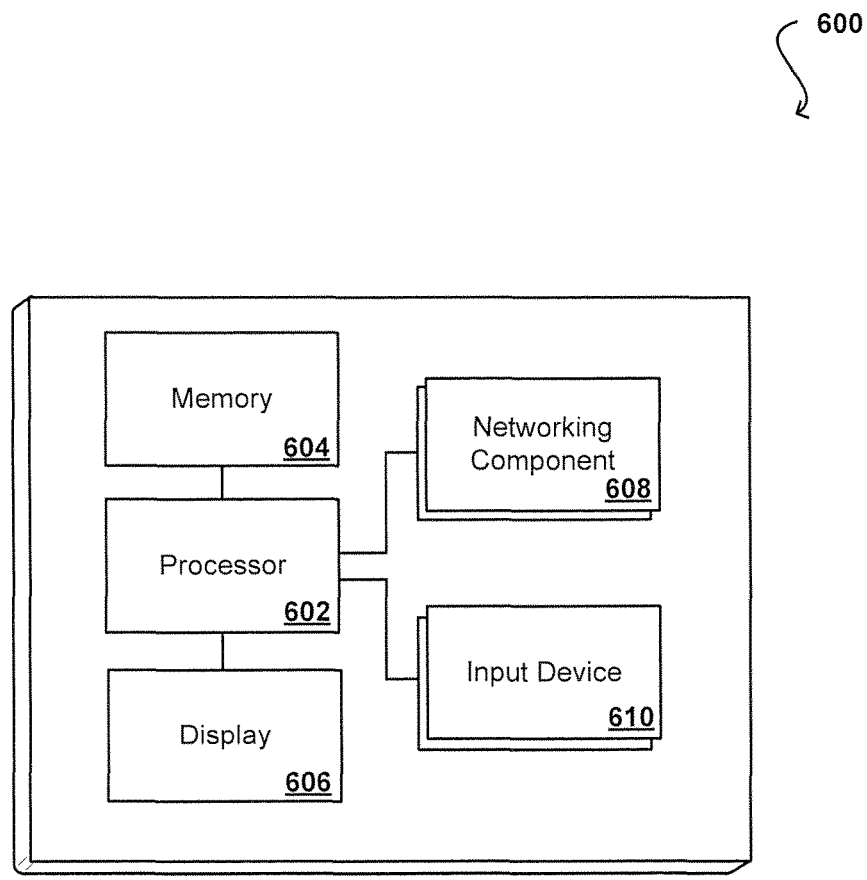
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a plurality of computing resources, at least one of the plurality of computing devices including a processor and a memory;
   a plurality of gatherers, each of the gatherers capable of executing on a respective computing resource of the plurality of computing resources allocated to a user, gathering a respective type of information at a specified time, and rejecting the information that does not conform to a specified format;
   a user interface providing access to the system on behalf of the user; and
   a system manager configured to receive a request via the user interface, the request specifying a subset of the computing resources from which to obtain one or more types of information, the subset of the computing resources including a plurality of virtual machines allocated to the user, the system manager further configured to determine a subset of the plurality of gatherers for obtaining the one or more types of information from the subset of the computing resources, the one or more types of information relating at least to operating systems installed on the subset of computing resources, the system manager further configured to store inventory reports generated by the subset of the plurality of gatherers into a user-accessible location from which the user can access the inventory reports via the user interface.

2. The system of claim 1, wherein the one or more types of information relate to at least one of software, software versions, software updates, or software patches installed on the subset of computing resources.

3. The system of claim 1, wherein the user interface is configured to present a set of predefined actions that are selectable through the user interface, the predefined actions relating to obtaining at least one type of data using at least one respective gatherer.

4. A computer-implemented method, comprising:
   determining installation information to be obtained for a set of resources allocated to a user, the installation information relating at least to software installed on the set of resources;
   determining a set of gatherers for obtaining the installation information, each gatherer of the set of gatherers configured to obtain at least a portion of the installation information;
   causing each gatherer of the set of gatherers to be executed at a specified time using the set of resources, at least one of the set of gatherers rejecting a portion of the installation information that is not in a specified format, each gatherer of the set of gatherers generating a respective data set representing a respective portion of the installation information; and
   providing access to the installation information from a user-accessible location to which the respective data set from each gatherer of the set of gatherers is stored.

5. The computer-implemented method of claim 4, further comprising:
   receiving indication of at least one of the set of resources or the installation information through a user console.

6. The computer-implemented method of claim 5, further comprising:
   causing the user console to display one or more pre-defined actions relating to the installation information; and
   receiving selection of a selected action of the pre-defined actions, the selected action associated with the set of gatherers to be executed.

7. The computer-implemented method of claim 4, wherein the set of resources allocated to the user includes a plurality of virtual machines executing at least one guest operating system.

8. The computer-implemented method of claim 4, wherein the installation information relates to at least one of software, operating systems, software versions, software updates, or software patches installed on the set of resources.

9. The computer-implemented method of claim 4, wherein each gatherer comprises script executable on at least one of the set of resources, each gatherer configured to obtain information from at least one specific location on a respective resource on which the gatherer is executing.

10. The computer-implemented method of claim 4, further comprising:
    receiving a custom gatherer configured to obtain a specific type of data from a specific location on at least one resource of the set of resources; and
    enabling the custom gatherer to be selected for use in obtaining at least a respective portion of the installation information.

11. The computer-implemented method of claim 4, further comprising:
    determining a format in which the installation information is to be provided; and
    causing the gatherers to provide the respective data sets in the determined format.

12. The computer-implemented method of claim 4, further comprising:
    causing the data sets for a specific resource of the set of resources to be stored to a folder associated with the specific resource.

13. The computer-implemented method of claim 4, further comprising:

determining that a user associated with the set of resources has permission to access the set of gatherers; and obtaining the set of gatherers from a gatherer repository containing a plurality of preconfigured gatherers.

14. A system, comprising:

at least one processor; and memory including instructions that, when executed by the at least one processor, cause the system to:

determine installation information to be obtained for a set of resources allocated to a user, the installation information relating at least to software installed on the set of resources;

determine a set of gatherers for obtaining the installation information, each gatherer of the set of gatherers configured to obtain at least a portion of the installation information;

cause each gatherer of the set of gatherers to be executed at a specified time using the set of resources, at least one of the set of gatherers rejecting a portion of the installation information that is not in a specified format, each gatherer of the set of gatherers generating a respective data set representing a respective portion of the installation information; and provide access to the installation information from a user-accessible location to which the respective data set from each gatherer of the set of gatherers is stored.

15. The system of claim 14, wherein the instructions when executed further cause the system to:

cause a user console to display one or more pre-defined actions relating to the installation information; and receive a selection of a selected action of the pre-defined actions, the selected action associated with the set of gatherers to be executed.

16. The system of claim 14, wherein the instructions when executed further cause the system to:

determine a format in which the installation information is to be provided; and cause the gatherers to provide the respective data sets in the determined format.

17. The system of claim 14, wherein the set of resources allocated to the user includes a plurality of virtual machines, and wherein the installation information relates to at least one of software, operating systems, software versions, software updates, or software patches installed on the set of plurality of virtual machines.

18. The system of claim 14, wherein each gatherer comprises script executable on at least one of the set of resources, each gatherer configured to obtain information from at least one specific location on a respective resource on which the gatherer is executing.

19. The system of claim 14, wherein the instructions when executed further cause the system to:

cause the data sets for a specific resource of the set of resources to be stored to a folder associated with the specific resource.

20. The system of claim 14, wherein the instructions when executed further cause the system to:

determine that a user associated with the set of resources has permission to access the set of gatherers; and obtain the set of gatherers from a gatherer repository containing a plurality of preconfigured gatherers.

* * * * *